Aug. 1, 1939.   B. WELSER ET AL   2,168,277

SPROCKET CHAIN LUBRICATION

Filed June 21, 1937

Inventors
Brinton Welser and
Maurice G. Jewett,
By Barber & Collings
Attorneys

Patented Aug. 1, 1939

2,168,277

UNITED STATES PATENT OFFICE 2,168,277

SPROCKET CHAIN LUBRICATION

Brinton Weiser and Maurice G. Jewett, Milwaukee, Wis., assignors to Chain Belt Company, Milwaukee, Wis., a corporation of Wisconsin Application June 21, 1937, Serial No. 149,533

3 Claims. (Cl. 74—257)

The present invention relates to sprocket chain lubrication, and has for one of its objects to provide a simple and effective construction for facilitating the feeding of oil or similar lubricant to the pintles of roller chains. In one well known form, such chains comprise links each made up from a pair of spaced side bars connected at one end by a hardened sleeve or bushing which is press-fitted into apertures formed in the side bars, thus providing a rigid substantially U-shaped link. The ends of the side bars at the open end of the link are also apertured for the reception of the chain pintle, and when the open end of one link is arranged complementarily relative to the closed end of another link, the pintle may be slipped through the alined open-end apertures and bushing, and pivotally connect the two links together. In many instances, rollers are mounted on the bushings to protect them from wear which would result from drect contact thereof with the sprocket teeth.

When mounted on sprockets to transmit power between spaced shafts, the force imparted by the tooth of the drive sprocket to the roller with which it engages is transmitted to its bushing, thence to the side bars, then to the pintle at the other end of the link, and by it to the bushing of the following link, and in the same manner to each successive link in the power transmission side of the chain between the driving and driven sprockets.

The pintles are held against rotation in their side bar apertures, and the bushings are a loose running fit thereon, providing for articulation of the links. The clearances between the overlapping portions of the side bars of successive links are ordinarily only a few hundredths of an inch, and those between the ends of the rolls and the adjacent side bars are not much greater, as a result of which the introduction of oil or similar lubricant to the complementary bearing surfaces of the pintles and bushings presents some difficulty.

One commonly employed method of attempting lubrication of the pintles and bushings has been to provide the bushings with diametrically opposed oil holes midway between the ends, and a complementary hole in the roller wall which may be alined through rotation of the roller with one or the other of said bushing holes, and then to pour oil on the upper face of the lower run of the chain in the hope that a sufficient quantity will pass through such holes if and when they aline to adequately lubricate the pintle and bushing bearing surfaces.

The diametrically opposed oil holes just referred to, in addition to being located midway between the bushing ends, have heretofore been disposed at right angles to the line of straight chain pull, and may have conducted some of the oil fed to them to the interior of the bushing. However, our experiments have indicated that this location at right angles to the line of straight chain pull is not that which is most suitable for the application and feeding of the oil to the pintle bearing. We have also determined through field tests and observation that such location is materially detrimental to the useful life of the chain, and more especially to heavy duty chains operating at high speeds, as the sharp edges of the holes gouge and abrade the pintles while flexing around the sprockets, taking small pieces of material out of the pintles, which pieces find their way between the pintles and their bushings, and cause gouging and unduly rapid wear between these parts. It is therefore one of the principal objects of the invention to locate these holes in the bushing in such manner as to be most advantageous, not only for lubricating the pintle-bushing bearing, but also for permitting the chain to flex around sprockets without the sharp edge of the holes gouging or abrading the pintle.

With the above and other objects in view which will appear as the description proceeds, the invention consists in the novel details of construction, and combinations and arrangements of parts more fully hereinafter disclosed and particularly pointed out in the appended claims.

Referring to the accompanying drawing forming a part of this specification in which like reference characters designate like parts in all the views.

Figure 2:
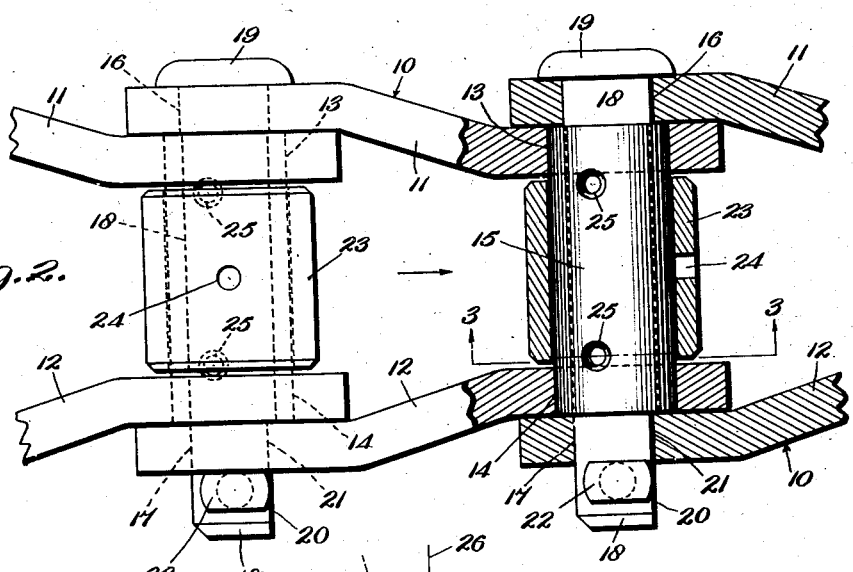
Fig. 2 is an enlarged sectional plan view of a portion of a sprocket chain, showing the oil feeding holes located in the bushings in accordance with the present invention.
Figure 3:
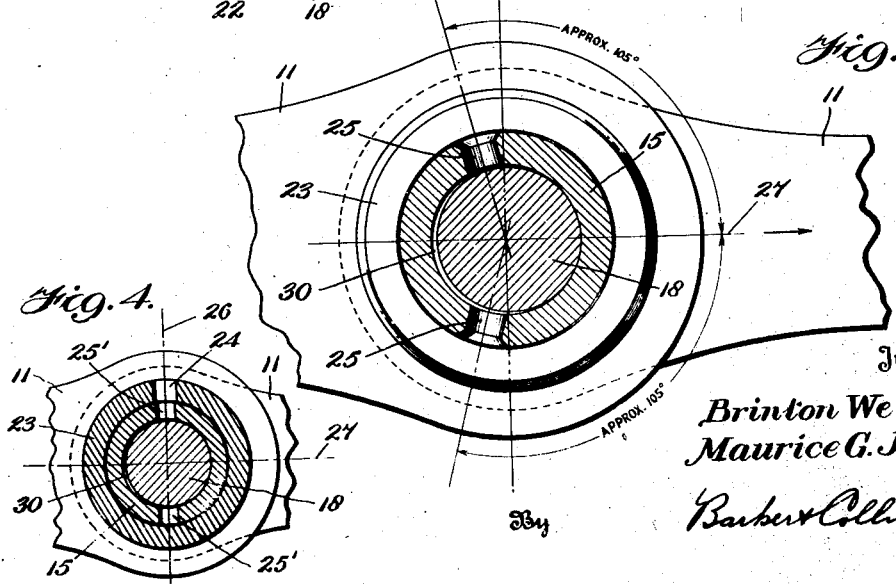
Figure 4:
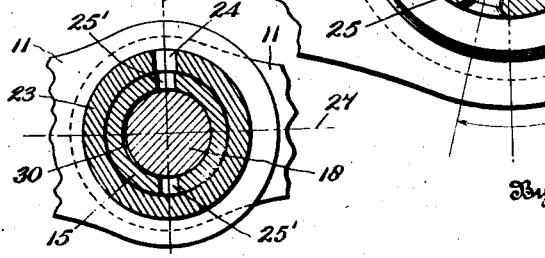

Fig. 3 is a still further enlarged vertical sectional view, taken approximately on the plane indicated by the line 3—3 of Fig. 2, looking in the direction of the arrows; and Fig. 4 is a view similar to Fig. 3, but on the same scale as Fig. 2, illustrating the prior art construction in which the diametrically opposed oil holes are located in a plane substantially at right angles to the line of chain pull.

Figure 1:
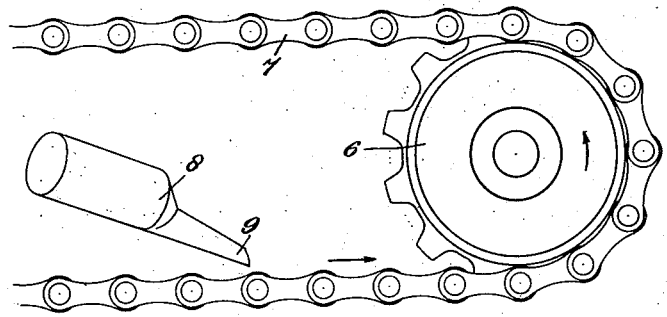
Figure 1 is a diagrammatic elevational view of a portion of a typical sprocket and chain installation, illustrating the method of lubrication referred to above.

Referring more particularly to Figure 1, 6 indicates a drive sprocket which may be considered rotating in the direction indicated by the arrow, and having trained about it a sprocket chain 7, while 8 indicates an oil can introduced between the upper and lower runs of the chain 7 with its spout 9 directed toward the upper surface of the lower run of the chain for applying oil to the parts.

As best shown in Figure 2, the chain 7 is made up of a plurality of links 10, each composed of the spaced side bars 11 and 12, which at one end are apertured as at 13 and 14 respectively for the reception of the ends of the sleeve or bushing 15, which as above explained are press-fitted into the apertures 13 and 14, thereby providing a substantially rigid U-shaped link. The other ends of the side bars 11 and 12 are apertured as at 16 and 17 respectively for the reception of the chain pintle 18 which is headed at one end as at 19, and at the other end is provided with a flat 20 engaging a corresponding flat 21 in the aperture 17 to prevent rotation of the pintle in the said bars. A lock pin or cotter 22 is passed through the projecting end of the pintle 18 to prevent its working out of the apertures 16 and 17, and a roller 23 provided with one or more oil holes 24 is journalled upon the exterior surface of the bushing 15 between the side bars 11 and 12.

The bushing 15 is provided with a plurality of countersunk oil holes 25 extending from its outer to its inner peripheries, and these holes are preferably so located, longitudinally of the bushing, that their circumference is substantially tangent to the inner surfaces of the side bars 11 and 12, as will be clear from Figure 2, where they may best receive the oil deposited from can 8, and transmit it to the pintle joint.

The oil holes 25 instead of being diametrically opposed, as indicated at 25' in the prior art construction of Fig. 4, are angularly disposed relative to the plane 26 (Fig. 3) perpendicular to the line of straight chain pull, being offset in a direction away from the line of contact between the bushing and pintle when the chain is in straight line tension. That is to say, referring to Fig. 3, the clearance between the pintle 18 and the bore of the bushing 15 is such that a free or loose fit exists between the two, say 1/64" or more, and with the chain in tension a crescent shaped space 30 will result. The oil holes 25 are positioned approximately 15 degrees from the plane 26, or 105 degrees from the plane 27, a plane determined by the line of straight chain pull and the line of contact of the bushing and pintle with the chain in tension, and are offset away from the above described line of contact of the bushing and pintle to admit oil into the crescent shaped space 30.

The plane 26 is coincident with the neutral axis of the bushing 15. That is to say, when the chain is in tension, there is a tendency for the pintle 18 to bend, which tendency is in turn transmitted to the bushing; and the neutral axis of the latter, with respect to this bending tendency, is coincidental with the plane 26. On this line the fibers in the bushing are in neither tension or compression, whereas at 90 degrees therefrom in one direction they are in maximum compression, and at 90 degrees therefrom in the other direction they are in maximum tension. Positioning the oil holes 25 with their axes approximately 15 degrees off this neutral axis does not materially weaken the bushing against these bending strains, but it does appreciably facilitate the transmission of the lubricant to the pintle journal.

When the oil holes are located in the plane 26 at right angles to the plane 27 of straight chain pull, as indicated at 25' in Fig. 4, and midway between the ends of the bushing 23, not only must the oil be fed thereto through the holes 24 of the roller 23, which seldom aline with the bushing holes 25' unless manually moved to such position, but during the articulation of the chain parts as they enter upon and leave the sprocket, the sharp edges of the said holes 25' scrape the surface of the pintle, gouging out small pieces of metal which work their way through the pintle bearing, accelerating wear thereof.

On the other hand, the angular displacement of the holes 25 backward from the plane 26 disposes their discharge ports adjacent the crescent shaped space 30 between the pintle and bushing surfaces, so that the sharp hardened edges of said ports do not contact with the bearing surface of the pintle, thus practically eliminating scraping or gouging of the pintle and wear of the journal resulting from the abrasive action of the metal so displaced.

The said angular displacement of the holes 25, by causing them to discharge into the space 30 has been found in practice to materially aid in getting the lubricant to the bearing surfaces, while leaving their outer ends or inlet ports in good position to receive the lubricant from the spout 9 of can 8. Such reception is likewise facilitated by the longitudinal positioning of the holes 25 with their circumferences substantially tangent to the inner surfaces of the chain side bars, since as the rollers 23 move axially on the bushings 15 within the limits of their clearances, they expose a maximum of the inlet ports for the reception of the oil.

The holes 25 are not sufficiently inclined to the vertical when receiving the lubricant to appreciably impair the flow thereof by gravity to the space 30, and when they do become so inclined upon passing around the sprocket, centrifugal force occasioned by such passage comes into play and continues the feed of lubricant from the holes 25 to space 30 and to the bearing surfaces, as will be readily understood.

It is to be further noted the four oil holes in the bushing are so arranged that either side of the chain may be operated against the sprockets with equal facility of lubrication because one set of holes will always extend upwardly on the lower run of the chain.

The expression "line of straight chain pull," used herein is intended to mean the direction of pull or application of force from one link to another in the substantially straight run of the chain between the sprockets.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. A sprocket chain link comprising a pair of spaced flat-faced side bars connected by a sleeve arranged to receive a chain pintle, and a roller journalled upon said sleeve between said side bars with clearances between its ends and the inner faces of said bars, said sleeve having apertures extending through its wall for conducting oil to the internal bearing surfaces of the sleeve, said apertures being substantially tangent to the inner flat faces of said side bars and extending across the clearances between the roller ends and side bars.

2. A sprocket chain link comprising a pair of spaced flat-faced side bars connected by a sleeve arranged to receive a chain pintle, and a roller journalled upon said sleeve between said side bars with clearances between its ends and the inner faces of said bars, said sleeve having apertures extending through its wall for conducting oil to the internal bearing surfaces of the sleeve, said apertures being displaced arcuately approximately 105° from the plane of contact between the sleeve and pintle during straight line chain tension, and being positioned longitudinally of the sleeve to extend across the clearances between the roller ends and side bars.

3. A link for heavy duty high speed power transmitting sprocket chains comprising spaced side bars rigidly connected to a hollow sleeve arranged to receive a chain pintle, said sleeve having cylindrical inner and outer peripheries and radial lubrication apertures extending through its wall from said outer to said inner periphery in juxtaposition to the inward wall of each side bar and adjacent but rearwardly, as regards the direction of straight chain pull, from the neutral axis of said sleeve, whereby oil may be the more readily introduced to the bearing surfaces of said sleeve and pintle, while abrasion of the pintle by the inner edges of said apertures is prevented and substantially the maximum strength of said sleeve against deflection forces is maintained.

BRINTON WELSER.
MAURICE G. JEWETT.